United States Patent [19]
Maci

[11] 3,773,990
[45] Nov. 20, 1973

[54] TRANSMISSION CONTROL AND STEERING ARRANGEMENT WITH SENSOR SWITCH ASSEMBLY

[75] Inventor: Raymond J. Maci, Indianapolis, Ind.

[73] Assignee: General Motors Corporation, Detroit, Mich.

[22] Filed: Feb. 15, 1972

[21] Appl. No.: 226,589

[52] U.S. Cl. ............................ 200/61.54, 200/157
[51] Int. Cl. ...................... H01h 9/06, H01h 21/10
[58] Field of Search .............. 200/6 R, 6 B, 11 TW, 200/14, 17 R, 18, 27 R, 30 R, 61.54, 153 L, 153 LB, 157

[56] References Cited
UNITED STATES PATENTS

| | | | |
|---|---|---|---|
| 3,251,956 | 5/1966 | Rasor et al. | 200/14 |
| 3,188,404 | 6/1965 | Fichter | 200/14 |
| 1,704,949 | 3/1929 | Meisenheimer | 200/61.54 X |
| 3,094,592 | 6/1963 | Fisher | 200/27 R X |
| 3,663,770 | 5/1972 | Groskopfs | 200/18 X |
| 2,641,629 | 6/1953 | Bennett, Jr. | 200/157 X |

*Primary Examiner*—J. R. Scott
*Attorney*—Warren E. Finken et al.

[57] ABSTRACT

The drawings illustrate a steering and transmission control arrangement including a handlebar-type steering mechanism incorporating a readily visible indexing mechanism which is rotatable with the steering mechanism and indexable relative thereto without requiring the operator to remove either of his hands from the steering mechanism. A plurality of projections formed on the shift control mechanism may comprise, for example, cams or wafers, either of which serve to respectively engage switches mounted on the steering mechanism, depending upon the angular orientation therebetween, for selecting desired transmission drive ratios.

8 Claims, 5 Drawing Figures

TRANSMISSION CONTROL AND STEERING ARRANGEMENT WITH SENSOR SWITCH ASSEMBLY

This invention relates generally to vehicular transmission controls and steering arrangements and, more particularly, to such mechanisms for use in military tank applications.

In such military tank applications it is desirable that the steering and the transmission shifting mechanism be both readily visible and readily accessible to the tank operator throughout the range of seat position heights available to him during his range of operation, including seat positions which result in the operator's head being positioned out of a hatch-like opening in the top of the tank.

Accordingly, an object of the invention is to provide an improved combined transmission control and steering mechanism which is readily accessible and visible to the operator at all seating levels of operation.

Another object of the invention is to provide an improved transmission shift control and vehicle steering arrangement wherein the shift control mechanism is mounted in the center of the steering mechanism so as to be rotatable therewith and indexable relative thereto, the indexing process being accomplished manually by one or the other of the operator's thumbs while his hands remain at all times on the steering mechanism.

A further object of the invention is to provide a shifting and steering arrangement wherein an indexing plate is mounted within a circular steering mechanism housing having handlebars extending from opposite sides thereof, with suitable microswitches mounted in the housing so as to be sequentially closed by projections, such as cams or wafers formed on an extension of the enclosed indexing plate for selectively actuating particular transmission shift valve solenoids to obtain desired drive ratios.

Still another object of the invention is to provide a shift control arrangement including an indexing plate mounted in a steering column housing, with "Neutral", "Park", and a plurality of "Forward" and "Reverse" drive ratio stations formed thereon and thumb-notched so as to be manually indexable to an operating position relative to the steering mechanism housing, the thumb-notches being formed intermediate each adjacent pair of drive ratio stations.

A still further object of the invention is to provide an improved combined shifting and steering arrangement including a latching or locking mechanism for both retaining the shift mechanism in its "Park" position and serving to complete the vehicle starting circuit.

These and other objects and advantages of the invention will be apparent when reference is made to the following description and accompanying drawings, wherein.

Figure 1:
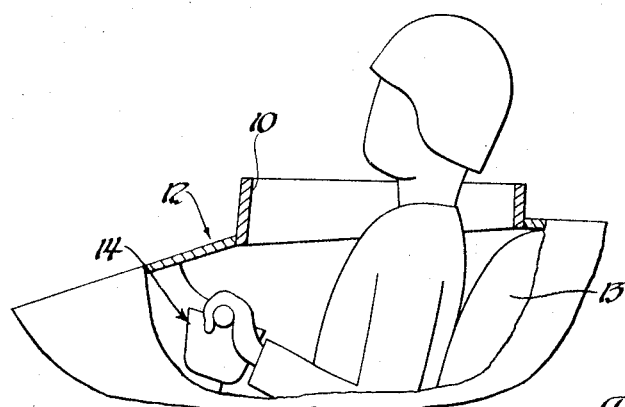
FIG. 1 is a fragmentary cross-sectional view of a military vehicle embodying the invention.
Figure 2:
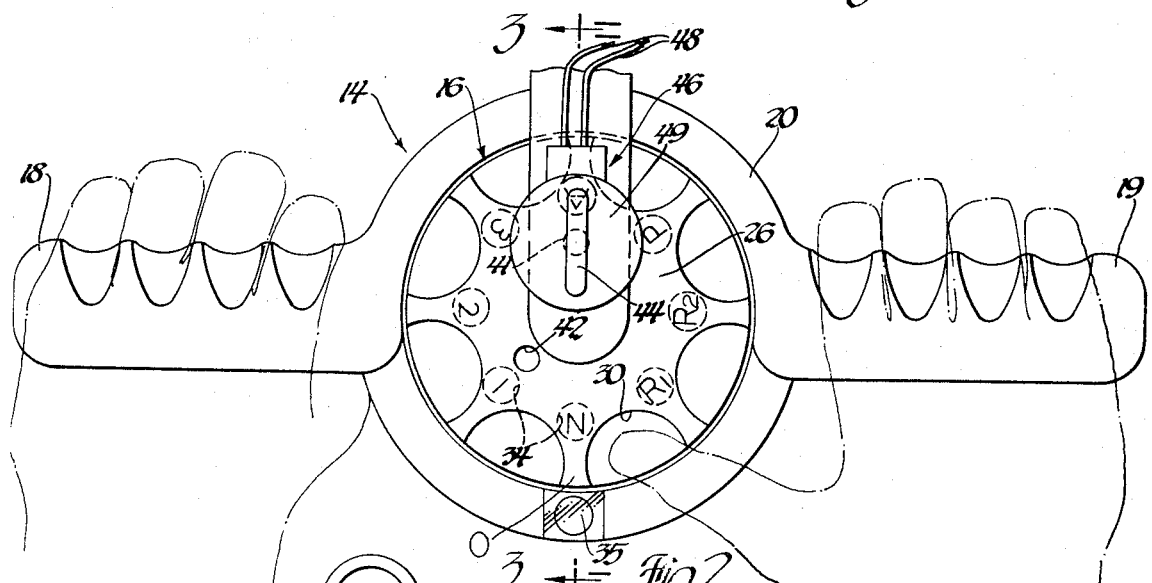
FIG. 2 is a plan view of the shifting and steering mechanism embodied in the invention.
Figure 3:
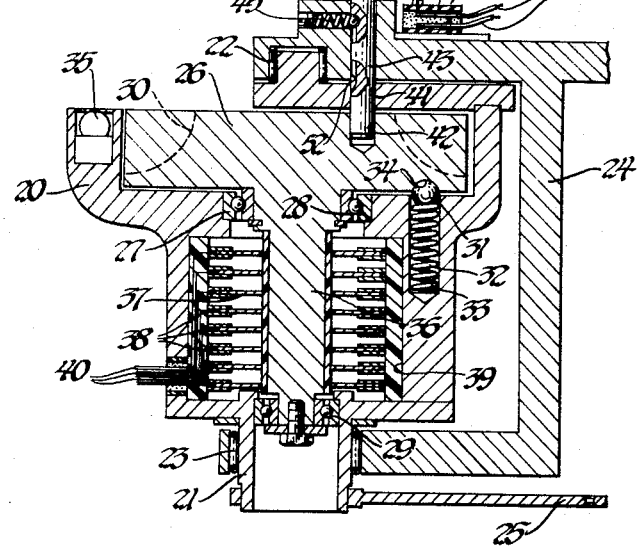
FIG. 3 is a cross-sectional view taken along the plane of line 3—3 of FIG. 2, and looking in the direction of the arrows.

Referring now to the drawings in greater detail, FIG. 1 illustrates that, in the usual military tank application, the operator's head at times extends through a relatively small hatch or headroom accommodation opening 10 formed in the top wall of the tank 12, depending upon the selected elevated position of the operator's seat 13. The steering and shifting mechanisms 14 are located inside the tank 12 in a less illuminated area. Since it is desirable that there be some readily visible and operable transmission range selector system available to the operator, the subject steering and shifting arrangement 14 includes an indexing-type ratio selector system 16 (FIG. 2) incorporated in the center of a pair of conventional steering bars or handlebars 18 and 19. The ratio selector system 16 is encased within a circular housing 20 formed intermediate the handlebars 18 and 19 and rotatable therewith. The housing 20, including a lower cylindrical extension 21, is rotatably mounted within upper needle bearing 22 (FIG. 3) and lower needle bearings 23 mounted in a fixed support member 24 fixed with respect to the walls of the tank 12. A lever 25 is secured to the lower cylindrical extension 21 of the housing 20 below the support member 24 for operative connection with the tank steering control (not shown).

An indexing plate 26 is mounted within the circular housing 20, rotatable therewith and yet able to be independently indexed relative thereto on upper bearings 27 (FIG. 3) rotatably mounted on a shoulder 28 formed on an inner periphery of the housing 20 and on lower bearings 29 rotatably mounted in the housing 20. The indexing plate 26 includes "Park", second and first "Reverse", "Neutral", "First", "Second", "Third", and "Automatic" stations designated by the symbols "P", "$R_2$", "$R_1$", "N", "1", "2", "3", and "A", respectively.

A thumb-notch 30 is formed in between each pair of adjacent stations. It may be noted in FIG. 2 that the natural use of the operator's right thumb, while his hand remains on the handlebar 19, will index the plate 26 in a counterclockwise direction, producing upshifting through stations "1", "2", "3", etc., while the use of the operator's left thumb would index the plate 26 in a clockwise direction as required for downshifting or for shifting into first- or second-reverse speed ratios, depending upon the starting position of the indexing plate 26.

The indexed positions are controlled by virtue of a ball 31 (FIG. 3) adjacent a spring 32 mounted in an opening 33 formed in the housing 20 being urged outwardly into particular semispherical openings 34 formed in the underside of the indexing plate 26 below the respective P-$R_2$-$R_1$-N-1-2-3-A stations.

The position designated as "0" (FIG. 2), located on the housing 20 directly in front of the operator, is the operating position for the operative range selected. A light source 35 is mounted in the circular housing 20 adjacent the "0" station to illuminate the latter for the visual benefit of the operator. As may be noted in FIG. 3, a shaft 36 is formed on and extends downwardly from the center of the index plate 26 into the steering mechanism housing 20 and includes a plurality of wafers 37 mounted or formed on the outer periphery thereof which align respectively with a pluraltiy of switches 38 circumferentially mounted in a cylindrical chamber 39 formed in the housing 20 around the shaft 36. As the selector stations 1-2-3-A-$R_1$-$R_2$ are indexed to the operating position "0", the wafers 37 sequentially actuate the respective adjacent switches 38 which, via respective wire leads 40, energize the associated transmission valve solenoids of the type illustrated and described in United States Pat. No. 3,505,907 which issued in the names of Fox et al, on Apr. 14, 1970, to thereby produce the selected drive range.

The usual hydraulic and electrical controls incorporated in the transmissions of the type described in the above-mentioned patent are such that, when the station "A" is rotated quickly to the operating position "0", the transmission will automatically shift up and down through First, Second, Third, and into Fourth gear ratio at designated speed ranges. Otherwise, if stations "1", "2" or "3" are indexed individually into the position "0", the transmission will automatically shift up to the highest selected range and will remain in that range until the selector lever position is changed.

Vertical openings 41 and 42 are formed in the housing 20 and in the indexing plate 26, respectively. The opening 42 is located adjacent station "1", 180° circumferentially apart from the "Park" or "P" station. Thus it may be noted that when "P" station is indexed to the operating position "0", the openings 41 and 42 are aligned and a lever or stem 43 (FIG. 3) extending from a ring-like handle 44 may be manually urged against the force of a sidewardly abutting spring 45 downwardly through the opening 41 into the opening 42, locking the index plate 26 in the "Park" position. A starter relay microswitch arrangement, represented generally at 46 in FIG. 3 and mounted on the support member 24, includes a switch 47 and associated wire leads 48. The vehicle engine may be started only when the stem 43 is positioned in the opening 42. In the latter position, a collar 49 depresses a projection 50 which causes the switch 47 to close to complete the starter relay circuit in readiness for starter-button acitvation. Inasmuch as the stem 43 is extended through the opening 41 in the housing 20, the latter and the associated handlebars 18 and 19 are locked in the Neutral steering position and unable to be inadvertently rotated. When withdrawn, the stem 43 is retained above the housing 20 by the spring 45 which extends into a notch or groove 52 formed in the stem 43.

Figure 4:
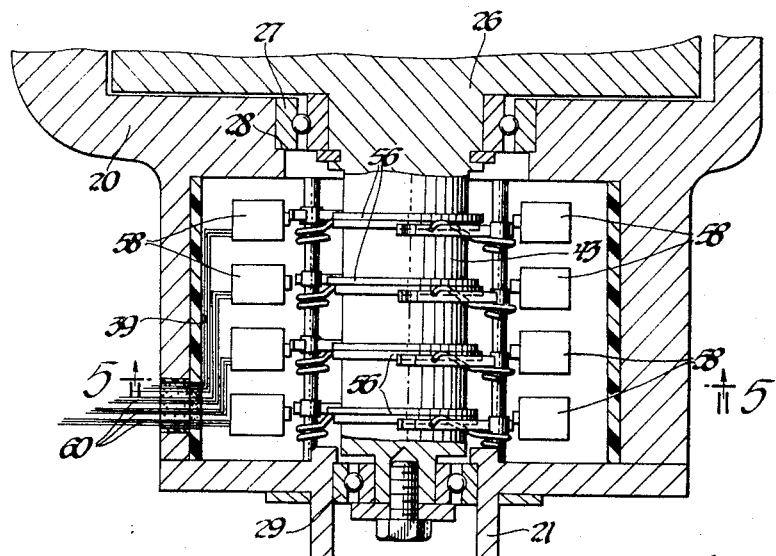
FIG. 4 is a fragmentary cross-sectional view of an alternate embodiment of a portion of the FIG. 3 structure.
Figure 5:
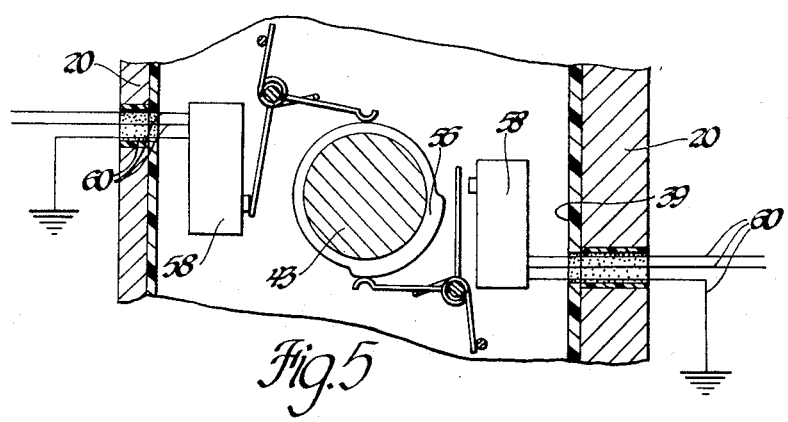
FIG. 5 is a cross-sectional view taken along the plane of line 5-5 of FIG. 4, as if FIG. 4 were a full-round view, and looking in the direction of the arrows.

The alternate embodiment illustrated in FIGS. 4 and 5 includes a plurality of cams 56 formed on the indexing stem 43 in lieu of the wafers 37. Depending upon the circumferential position of the indexing plate 26 with respect to the housing 20, the cams 56 actuate respective cooperating microswitches 58 mounted in the chamber 39. Wire leads 60 extend from the microswitches 58 to the respective shift control solenoids in the transmission.

It should be apparent that the invention provides a compact, efficient, and readily accessible and visible coordinated shifting and steering arrangement particularly suitable for military tank applications wherein the operator's head position varies with respect to the shifting and steering mechanism and with respect to the outer wall of the tank during different driving conditions.

While but two embodiments of the invention have been shown and described, other modifications are possible.

I claim:

1. A vehicle steering and control mechanism suitable for actuating controlled devices and comprising a steering mechanism housing, first and second chambers formed in said housing, an indexing plate mounted in said first chamber and adapted to rotate with said housing and to be manually indexed relative thereto, a plurality of speed ratio selector stations formed on said indexing plate, a thumb-notch formed intermediate each adjacent pair of said stations for manually indexing said indexing plate relative to said housing, a shaft formed on and extending from said indexing plate into said second chamber, a plurality of projections formed on said shaft at spaced axial locations thereon and corresponding to said speed ratio selector stations, a plurality of axially spaced switches mounted in said second chamber and adapted to be respectively progressively closed by said projections during indexing of said index plate to respectively actuate said controlled devices, and detent means operatively connected between said indexing plate and said housing for retaining said indexing plate in position after being manually indexed, said detent means including a vertical opening formed in said housing, a semispherical opening formed in said indexing plate adjacent each of said selector stations, and a spring and ball mounted in said vertical opening, said spring urging said ball into any said adjacent selectively positioned semispherical opening.

2. The vehicle steering and control mechanism described in claim 1, wherein said controlled devices are transmission shift control solenoids, and said indexing plate includes Neutral, Park, Forward, and Reverse selector stations, with said projections respectively causing said switches to close in response to manual indexing of said plate to respectively energize said solenoids for producing corresponding selected drive ratios.

3. The vehicle steering and control mechanism described in claim 2, and locking means operatively connected to said indexing plate for retaining said Park station of said indexing plate in the operative position.

4. The vehicle steering and control mechanism described in claim 3, wherein said locking means includes an opening formed in said indexing plate for rotation therewith, and a locking pin secured radially and slidable axially to cooperate with said opening while said indexing plate is positioned in said Park station.

5. A vehicle steering and control mechanism suitable for actuating controlled devices and comprising a steering mechanism housing, first and second chambers formed in said housing, an indexing plate mounted in said first chamber and adapted to rotate with said housing and to be manually indexed relative thereto, a plurality of speed ratio selector stations formed on said indexing plate, a thumb-notch formed intermediate each adjacent pair of said stations for manually indexing said indexing plate relative to said housing, a shaft formed on and extending from said indexing plate into said second chamber, a plurality of cams formed on said shaft at spaced axial locations thereon and corresponding to said speed ratio selector stations, a plurality of axially spaced switches mounted in said second chamber and adapted to be respectively progressively closed by said cams during indexing of said indexing plate to respectively actuate said controlled devices.

6. A vehicle steering and control mechanism suitable for actuating controlled devices and comprising a steering mechamism housing, first and second chambers formed in said housing, an indexing plate mounted in said first chamber and adapted to rotate with said housing and to be manually indexed relative thereto, a plurality of speed ratio selector stations formed on said indexing plate, a thumb-notch formed intermediate each adjacent pair of said stations for manually indexing said indexing plate relative to said housing, a shaft formed on and extending from said indexing plate into said second chamber, a plurality of wafers mounted on said shaft at spaced axial locations thereon and corresponding to said speed ratio selector stations, a plurality of axially spaced switches mounted in said second chamber and adapted to be respectively progressively closed by said wafers during indexing of said indexing plate to respectively actuate said controlled devices.

7. A vehicle steering and control mechanism for concurrently steering a vehicle and selectively energizing transmission valve solenoids, said mechanism comprising a steering mechanism housing, first and second chambers formed in said housing, an indexing plate mounted on bearings in said first chamber and adapted to rotate with said housing and to be manually indexed relative thereto, a plurality of speed ratio selector stations formed on said indexing plate, a thumb-notch formed intermediate each adjacent pair of said stations, a shaft formed on and extending from said indexing plate through said bearings into said second chamber, a plurality of cams formed on said shaft and corresponding to said speed ratio selector stations, a plurality of microswitches mounted in said second chamber and operatively connected to said solenoids, said microswitches being adapted to be respectively progressively closed by said cams during said manual indexing of said indexing plate via said thumb-notches to respectively energize said solenoids, and detent means operatively connected between said indexing plate and said housing for retaining said indexing plate in position after manual indexing thereof.

8. A vehicle steering and control mechanism for actuating controlled devices, said vehicle steering and control mechanism comprising a steering mechanism housing, first and second chambers formed in said housing, an indexing plate mounted in said first chamber and adapted to rotate with said housing and to be manually indexed relative thereto, a plurality of speed ratio selector stations formed on said indexing plate, a thumb-notch formed intermediate each adjacent pair of said stations for manually indexing said indexing plate relative to said housing, a shaft formed on and extending from said indexing plate into said second chamber, a plurality of projections formed on said shaft at spaced axial locations thereon and corresponding to said speed ratio selector stations, and a plurality of axially spaced switches mounted in said second chamber and adapted to be respectively progressively closed by said projections during indexing of said indexing plate to respectively actuate said controlled devices.

* * * * *